US008946939B2

(12) United States Patent
Drennen

(10) Patent No.: US 8,946,939 B2
(45) Date of Patent: Feb. 3, 2015

(54) SYSTEMS AND METHODS FOR DETECTING AND PROTECTING A WIRELESS POWER COMMUNICATION DEVICE IN A WIRELESS POWER SYSTEM

(75) Inventor: William Anthony Drennen, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 13/352,186

(22) Filed: Jan. 17, 2012

(65) Prior Publication Data
US 2012/0248891 A1    Oct. 4, 2012

Related U.S. Application Data

(60) Provisional application No. 61/470,380, filed on Mar. 31, 2011.

(51) Int. Cl.
*H02J 17/00* (2006.01)
*H04B 5/00* (2006.01)
*H02J 5/00* (2006.01)
*H02J 7/02* (2006.01)

(52) U.S. Cl.
CPC ............. *H04B 5/0037* (2013.01); *H02J 17/00* (2013.01); *H02J 5/005* (2013.01); *H02J 7/025* (2013.01)
USPC ......................................................... 307/104

(58) Field of Classification Search
CPC ............................... H02J 17/00; H04B 5/0037
USPC ......................................................... 307/104
See application file for complete search history.

(56) References Cited

U.S. PATENT DOCUMENTS

| | | | |
|---|---|---|---|
| 6,856,275 B1 | 2/2005 | Ehlers et al. | |
| 7,902,961 B2 | 3/2011 | Yamazoe et al. | |
| 7,989,986 B2 * | 8/2011 | Baarman et al. | 307/104 |
| 8,183,827 B2 * | 5/2012 | Lyon | 320/108 |
| 2004/0145342 A1 | 7/2004 | Lyon | |
| 2007/0025245 A1 | 2/2007 | Porras et al. | |
| 2008/0157603 A1 | 7/2008 | Baarman et al. | |
| 2011/0002413 A1 | 1/2011 | Mukkavilli et al. | |

FOREIGN PATENT DOCUMENTS

| | | |
|---|---|---|
| CN | 101622629 A | 1/2010 |
| EP | 1510985 A2 | 3/2005 |
| WO | WO2006132985 A1 | 12/2006 |

OTHER PUBLICATIONS

International Search Report and Written Opinion—PCT/US2012/030605—ISA/EPO—Jul. 13, 2012.

* cited by examiner

*Primary Examiner* — Hal Kaplan
(74) *Attorney, Agent, or Firm* — Knobbe Martens Olson & Bear LLP

(57) ABSTRACT

Embodiments are directed to detecting and limiting power transfer to communication device, such as NFC and RFID cards. A method may include detecting one or more communication devices positioned within a wireless power transfer region of a wireless power transmitter. The method may further include limiting an amount of power transmitted by a transmitter in response to the detection.

20 Claims, 8 Drawing Sheets

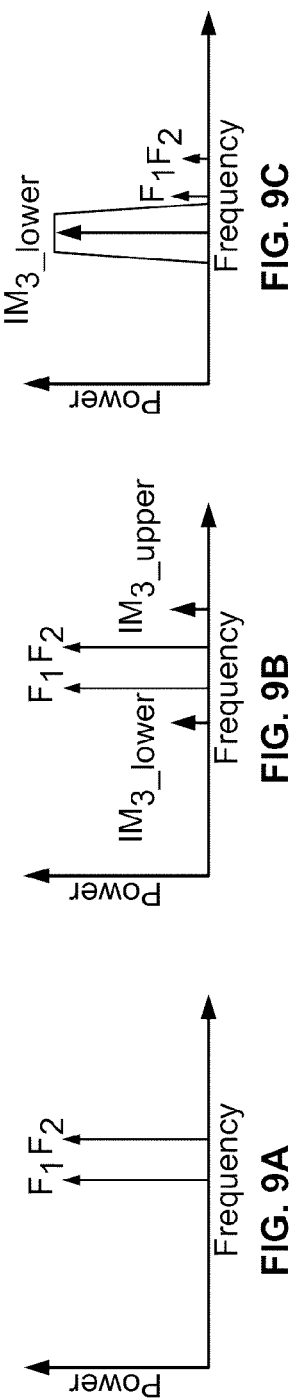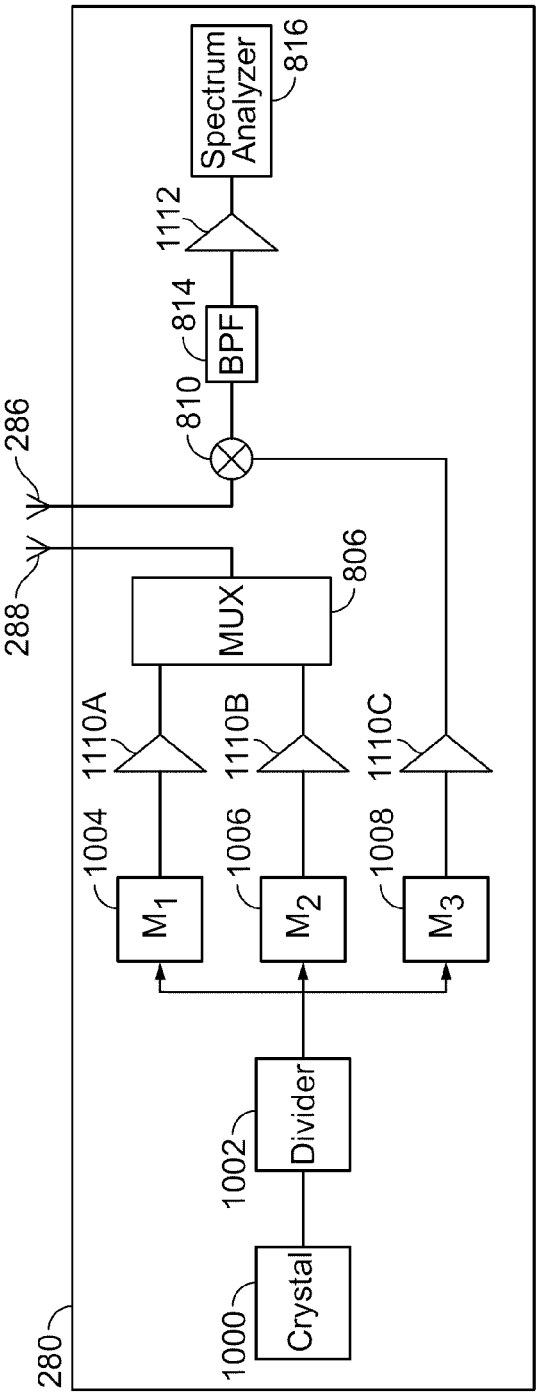

SYSTEMS AND METHODS FOR DETECTING AND PROTECTING A WIRELESS POWER COMMUNICATION DEVICE IN A WIRELESS POWER SYSTEM

CROSS REFERENCE TO RELATED APPLICATIONS

This application claims priority benefit under 35 U.S.C. §119(e) to U.S. Provisional Patent Application No. 61/470,380 entitled "NEAR FIELD COMMUNICATION CARDS DETECTION" filed on Mar. 31, 2011, the disclosure of which is hereby incorporated by reference in its entirety.

FIELD

The present invention relates generally to wireless power. More specifically, the disclosure is directed to systems, device, and methods for detecting a vulnerable device (e.g., a device that may be damaged by a wireless power transfer field), including near-field communication devices and radio-frequency identification (RFID) cards, within a charging region of a wireless power transmitter. Some embodiments relate to systems, devices, and methods for adjusting wireless power transfer and/or limiting wireless power delivery based on detection of vulnerable devices, including near-field communication devices, positioned within a charging region of a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

A vulnerable device, such as a near field communication (NFC) device, which is operating at the same frequency or capable of receiving power from a wireless power transmitter, may receive excessive power from the wireless power transmitter. Receiving excessive power may result in undesirable heating or destruction of the vulnerable device.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

According to one aspect, a method of detecting a communication device within a wireless power transfer region of a wireless power transmitter configured to transfer power to a device is disclosed. The method includes generating a wireless power transfer field at a power level, transmitting a first signal at a first frequency and a second signal at a second frequency, detecting a third signal at a third frequency, the third frequency corresponding to an intermodulation product of the first frequency and the second frequency, and reducing the power level of the wireless power transfer field in response to the detection of the third signal.

According to another aspect, an apparatus is disclosed. The apparatus includes a wireless power transmitter configured to generate a wireless power transfer field at a power level, a detection signal transmitter configured to transmit a first signal at a first frequency and a second signal at a second frequency, a tone receiver configured to detect a third signal at a third frequency, the third frequency corresponding to an intermodulation product of the first frequency and the second frequency, and a controller configured to reduce the power level of the wireless power transfer field in response to the detection of the third signal.

According to another aspect, an apparatus for detecting a communication device within a wireless power transfer region is disclosed. The apparatus includes means for generating a wireless power transfer field at a power level, means for transmitting a first signal at a first frequency and a second signal at a second frequency, means for detecting a third signal at a third frequency, the third frequency corresponding to an intermodulation product of the first frequency and the second frequency, and means for reducing the power level of the wireless power transfer field in response to the detection of the third signal.

According to another aspect, a computer program product for processing data for a program configured to detect a communication device within a wireless power transfer region of a wireless power transmitter configured to transfer power to a device via a wireless power transfer field is disclosed. The computer program product includes a non-transitory computer-readable medium having stored thereon code for causing processing circuitry to transmit a first signal at a first frequency and a second signal at a second frequency, detect a third signal at a third frequency, the third frequency corresponding to an intermodulation product of the first frequency and the second frequency, and reduce a power level of the wireless power transfer field in response to the detection of the third signal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 9A-9C illustrate some examples of a first frequency signal and a second frequency signal and a detected third frequency signal according to some embodiments.

FIG. 10 illustrates a more detailed block diagram of the presence detector according to some embodiments.

DETAILED DESCRIPTION

The detailed description set forth below in connection with the appended drawings is intended as a description of embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the embodiments of the invention. It will be apparent to those skilled in the art that the embodiments of the invention may be practiced without these specific details. In some instances, well-known structures and devices are shown in block diagram form in order to avoid obscuring the novelty of the embodiments presented herein.

Wirelessly transferring power may refer to transferring any form of energy associated with electric fields, magnetic fields, electromagnetic fields, or otherwise that is transmitted from a transmitter to a receiver without the use of physical electrical conductors. (e.g., power may be transferred through free space). The power output into a wireless field (e.g., a magnetic field) may be received or captured by a receiving antenna or coil to achieve power transfer.

Figure 1:
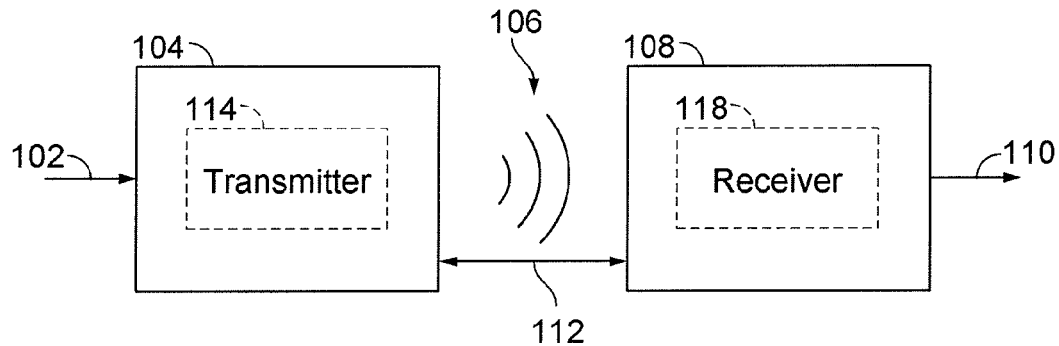
FIG. 1 is a functional block diagram of a wireless power transfer system according to some embodiments.

FIG. 1 is a functional block diagram of a wireless power transfer system according to some embodiments. Input power 102 may be provided to a wireless power transmitter 104 for generating a field 106 (e.g., an electromagnetic field) for transferring energy from a wireless power transmitter 104 to a wireless power receiver 108. During wireless power transfer, a wireless power receiver 108 may be coupled to the field 106 and generates an output power 110 for storage or consumption by a device (not shown) coupled to the wireless power receiver 108 for receiving the output power 110. The wireless power transmitter 104 and the wireless power receiver 108 are separated by a distance 112. In one embodiment, the wireless power transmitter 104 and the wireless power receiver 108 are configured according to a mutual resonant relationship. When the resonant frequency of wireless power receiver 108 and the resonant frequency of wireless power transmitter 104 are substantially the same or very close to one another, transmission losses between the wireless power transmitter 104 and the wireless power receiver 108 are minimal when the wireless power receiver 108 is located in the "near-field" of the field 106 generated by the wireless power transmitter 104. As such, wireless power transfer may be provided over larger distance in contrast to purely inductive solutions that may require large coils that require coils to be very close (e.g., in the range of mms). Resonant inductive coupling techniques may thus allow for improved efficiency and power transfer over various distances and with a variety of antenna or coil configurations. The term "coil" is intended to refer to a component that may wirelessly output or receive energy for coupling to another "coil." The coil may also be referred to as an "antenna" of a type that is configured to wirelessly output or receive power. In some embodiments, a coil may also be referred to herein or configured as a "magnetic" antenna or an induction coil.

In one embodiment, The wireless power transmitter 104 may be configured to output a time varying magnetic field with a frequency corresponding to the resonant frequency of the transmit coil 114. When the receiver is within the field 106, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

The wireless power transmitter 104 further includes a wireless power transmit coil 114 for outputting an energy transmission and wireless power receiver 108 further includes a wireless power receive coil 118 for energy reception. As referred to herein, the near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils are sized according to applications and devices to be associated therewith. As described above, an efficient energy transfer occurs by coupling a large portion of the energy in the near-field of the wireless power transmit coil 114 to a wireless power receive coil 118 rather than propagating most of the energy in an electromagnetic wave to the far field. When positioned within the near-field, a coupling mode may be developed between the wireless power transmit coil 114 and the wireless power receive coil 118. The area around the wireless power transmit coil 114 and the wireless power receive 118 where this near-field coupling may occur may be referred to herein as a coupling-mode region.

Figure 2:
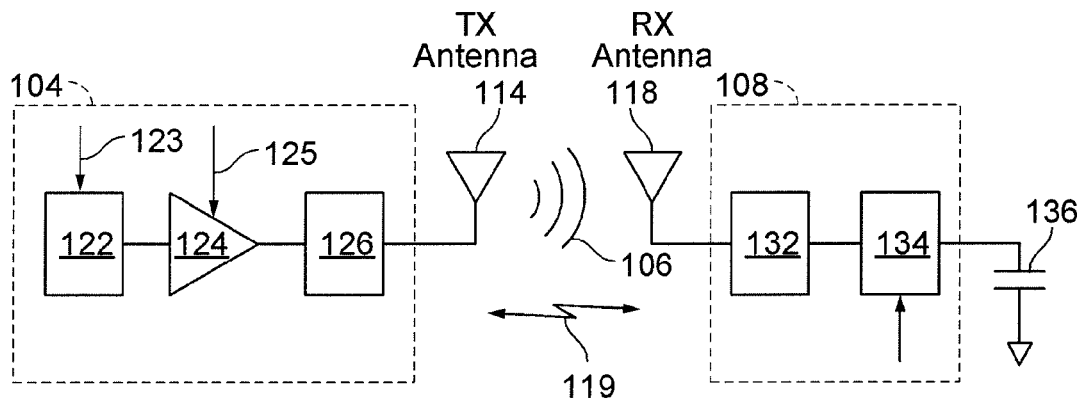
FIG. 2 is a more detailed block diagram of the wireless power transfer system of FIG. 1.

FIG. 2 shows a more detailed block diagram of the wireless power transfer system of FIG. 1. The wireless power transmitter 104 includes a wireless power signal generator 122 (e.g., a voltage controlled oscillator), a driver 124 (e.g., a power amplifier) and a Tx impedance adjustment circuit 126. The wireless power signal generator 122 is configured to generate a signal at a desired frequency, such as 468.75 KHz, 6.78 MHz or 13.56 MHz, which may be adjusted in response to a signal generator control signal 123. The signal generated by the wireless power signal generator 122 may be provided to a driver 124 configured to drive the transmit coil 114 at, for example, a resonant frequency of the transmit coil 114. The driver 124 may be a switching amplifier configured to receive a square wave from the wireless power signal generator 122 (e.g., an oscillator) and output a sine wave. For example, the driver 124 may be a class E amplifier. The signal generated by the wireless power signal generator 122 is received by the driver 124 and may be amplified by the driver 124 with an amplification amount corresponding to an amplification control signal 125. The Tx impedance adjustment circuit 126 may be connected to the output of the driver 124, and may be configured to adjust the impedance of the wireless power transmitter 104 based on the impedance of the wireless power transmit coil 114. In some embodiments, the Tx impedance adjustment circuit 126 may be configured to match the impedance of components of the wireless power transmitter 104 with the impedance of the wireless power transmit coil 114. While not illustrated, the wireless power transmitter 104 may also include a filter connected to the output of the driver 124 and the input of the Tx impedance adjustment circuit 126. The filter may be configured to filter out unwanted harmonics or other unwanted frequencies in the amplified signal.

The wireless power receiver 108 may include an Rx impedance adjustment circuit 132 and a power conversion circuit 134 to generate a DC power output to charge a load 136 as shown in FIG. 2, or power a device coupled to the wireless power receiver 108 (not shown). The Rx impedance adjustment circuit 132 may be included to adjust the impedance of the wireless power receiver 108 based on the impedance of the wireless power receive coil 118. In some embodiments, the Rx impedance adjustment circuit 132 may be configured to match the impedance of components of the wireless power receiver 108 with the impedance of the wireless power receive coil 118. The wireless power receiver 108 and wireless power transmitter 104 may communicate on a separate communication channel 119 (e.g., a Bluetooth channel, a zigbee channel, a cellular channel, or the like).

Wireless power receiver 108, which may initially have a selectively disablable associated load (e.g., load 136), may be configured to determine whether an amount of power transmitted by the wireless power transmitter 104 and received by the wireless power receiver 108 is appropriate for charging the load 136. Further, the wireless power receiver 108 may be configured to enable a load (e.g., load 136) upon determining that the amount of power is appropriate. In some embodiments, a wireless power receiver 108 may be configured to directly utilize power received from a wireless power transfer field without charging of a load 136 (e.g., a battery). For example, a communication device, such as a near-field communication (NFC) or radio-frequency identification device (RFID may be configured to receive power from a wireless power transfer field and communicate by interacting with the wireless power transfer field and/or utilize the received power to communicate with a wireless power transmitter 104 or other devices.

Figure 3:
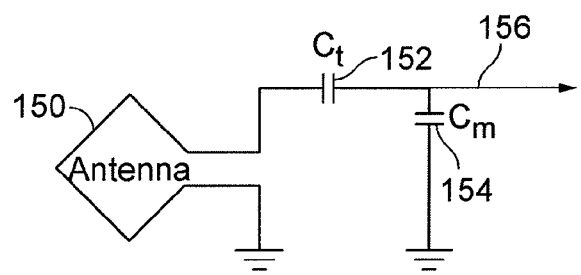
FIG. 3 illustrates a schematic diagram of a loop coil according to some embodiments.

FIG. 3 illustrates a schematic diagram of a loop coil 150 according to some embodiments. As illustrated in FIG. 3, coils used in embodiments may be configured as a "loop" coil 150, which may also be referred to herein as a "magnetic" coil. Loop coils may be configured to include an air core or a physical core such as a ferrite core. Air core loop coils may be more tolerable to extraneous physical devices placed in the vicinity of the core. Furthermore, an air core loop coil may allow placement of other components or circuits (e.g., integrated circuits) within the core area. Further, an air core loop may enable placement of a wireless power receive coil (e.g., wireless power receive coil 118 of FIG. 2) within a plane of a wireless power transmit coil (e.g., wireless power transmit coil 114 of FIG. 2), thereby increasing the coupling factor between the wireless power transmit coil 114 and the wireless power receive coil 118.

Efficient transfer of energy between the wireless power transmitter 104 and wireless power receiver 108 may occur during matched or nearly matched resonance between the wireless power transmitter 104 and the wireless power receiver 108. However, even when resonance between the wireless power transmitter 104 and wireless power receiver 108 are not matched, energy may be transferred, although the efficiency may be affected. As discussed above, energy transfer may occur by coupling energy within the near-field of the wireless power transmit coil 114 to the wireless power receive coil 118 positioned within an area of where the electromagnetic near-field is generated, rather than propagating the energy from the wireless power transmit coil 114 into free space.

The resonant frequency of the loop or magnetic coils is based on the inductance and capacitance of the coils. Inductance in a loop coil is generally the inductance of the loop, whereas, capacitance may generally be included in the form of a capacitive component connected to the loop coil to create a resonant structure (e.g., an LC circuit) having a desired resonant frequency. As a non-limiting example, capacitor 152 and capacitor 154 may be connected to loop coil 150 to create a resonant circuit that selects a signal at a resonant frequency 156. Other components (e.g., variable or fixed inductors, variable or fixed capacitors, and/or variable or fixed resistors) may also be connected to the loop coil 150 for controlling and adjusting the resonant frequency. For larger diameter loop coils 150, the size of capacitance needed to sustain resonance may decrease as the diameter or inductance of the loop increases. Furthermore, as the diameter of the loop or magnetic coil increases, the efficient energy transfer area of the near-field may increase. Other resonant circuits are possible. As another non-limiting example, a capacitor may be placed in parallel between the two terminals of the loop coil 150. For a wireless power transmit coil 114, the signal at the resonant frequency 156 may be provided as an input to the loop coil 150.

In a wireless power charging system, unauthorized devices or other components may interfere with the operation of a charging device in transmitting power to a device to be charged. For example, when a vulnerable device is introduced to a wireless charging system, it may be best to either shutdown or lower the power transmitted to protect the system and the vulnerable device. NFC devices can absorb significant amounts of power and can significantly heat up and become damaged through interaction with a wireless power transfer field. For example, a NFC device, which is operating at the same frequency or capable of receiving power from a wireless power transmitter, may receive excessive power from the wireless power transmitter. Receiving excessive power may result in undesirable heating of the NFC device, which may damage the NFC device.

According to some embodiments described herein, a system may be capable of allowing protection of vulnerable devices, such as NFC devices and RFID cards, from being destroyed, and protection of the wireless power transmitter 104 from operating in an inefficient state that could cause damage to the wireless power transmitter 104. While described herein with reference to NFC devices and RFID cards, the systems and methods described herein may be applicable to the detection of other devices which are not intended to be subjected to a wireless power field. Several of the structures and functions discussed above are described in greater detail below.

Figure 4:
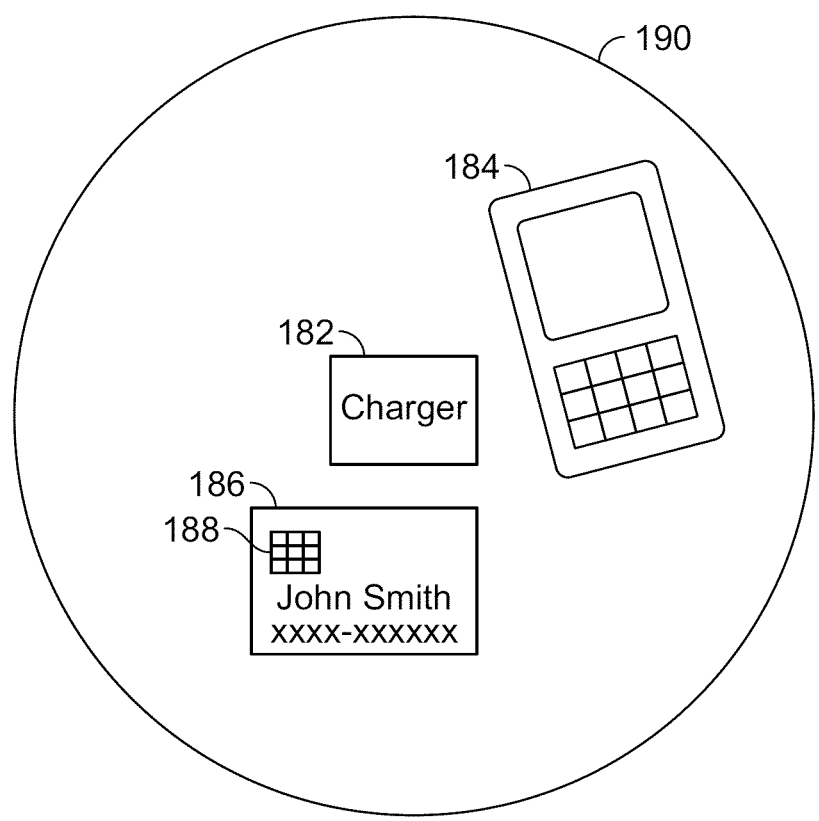
FIG. 4 illustrates another wireless power transfer system including devices within a charging area of a wireless power transmitter according to some embodiments.

FIG. 4 illustrates another wireless power transfer system including devices within a wireless power transfer region 190 of a wireless power transmitter 104 according to some embodiments. As illustrated in FIG. 4, the system may include a charger 182 and a wireless power chargeable device 184 within a wireless power transfer region 190 of the charger 182. The charger 182 may be include a wireless power transmitter (e.g., as discussed above with reference to wireless power transmitter 104) for charging the wireless power chargeable device 184. The charger 182 may be, for example, a charging device (e.g., a charging mat) connected to a power source via a wired connection, a charging device configured to receive power wirelessly and transfer the received power to the wireless power chargeable device 184, or a combination thereof. The wireless power chargeable device 184 as referenced herein is a broad term that includes, for example, an electronic camera, video recorder, a web cam, a cellular telephone, smart phone, portable media player, personal digital assistant, a laptop, a tablet computer, or the like. While not illustrated, the system may include multiple wireless power chargeable devices 184 within the wireless power transfer region 190 of the charger 182.

The system may further include a card 186 which includes a communication device 188, such as an near field communication (NFC) device, an RFID card, or the like). The card 186 may be an ID card (e.g., an access restricting security badge), a smart card, a credit card, or the like. The card 186 may be configured to communicate via the communication device 188 to transfer information (e.g., identification, transaction information, or the like. Although the communication device 188 is illustrated as included in a card 186, the communication device 188 is not limited thereto. For example, the communication device 188 may be included in a wireless power chargeable device 184 for communicating information regarding the wireless power chargeable device (e.g., identification information, or the like). The communication device 188 may use induction between a coil of the communication device 188 and a coil of a device in communication with the communication device 188 (e.g., near-field communication).

As illustrated in FIG. 4, card 186 and wireless power chargeable device 184 may be positioned within a wireless power transfer region 190 of charger 182. The orientation of the devices is not restricted to the orientation of the devices as illustrated in FIG. 4. As will be discussed in greater detail with reference to FIG. 5 below, charger 182 may be configured to detect a communication device 188. Moreover, charger 182 may be configured to protect a communication device 188, such as a NFC or RFID device, after detection thereof.

As described herein, charger 182 may be configured to detect, according to one or more methods, one or more vulnerable devices (e.g., a communication device 188) positioned within a wireless power transfer region 190 of a wireless power transmitter 104. According to some embodiments, charger 182 may be configured to transmit detection signals and detect harmonics and/or mixing products of the detection signals in order to detect a communication device 188. According to some embodiments, charger 182 may be configured to determine whether or not power, which is being transmitted by a wireless power transmitter 104 of charger 182 within an associated wireless power transfer region 190, is unaccounted for. Charger 182 may be configured to determine, via one or more measured properties associated with the wireless power transmitter 104, whether a communication device 188 is within a wireless power transfer region 190 of the charger 182.

Charger 182 may be configured to, according to one or more methods, protect (e.g., reduce or possibly eliminate generation of a power transfer field) in the presence of one or more vulnerable devices (e.g., communication device 188), which are detected within an associate wireless power transfer region 190. For example, charger 182 may be configured in a manner to prevent a communication device 188, such as a NFC device, from being positioned within a region of a wireless power transmit coil 114 during wireless power charging. Therefore, the communication device 188 (e.g., a NFC device) may not be positioned within a zone with the strongest power transfer field. According to another exemplary embodiment, charger 182 may be configured to reduce, or eliminate, (e.g., turn off) the power transferred therefrom based on the detection of the communication device 188.

Figure 5:
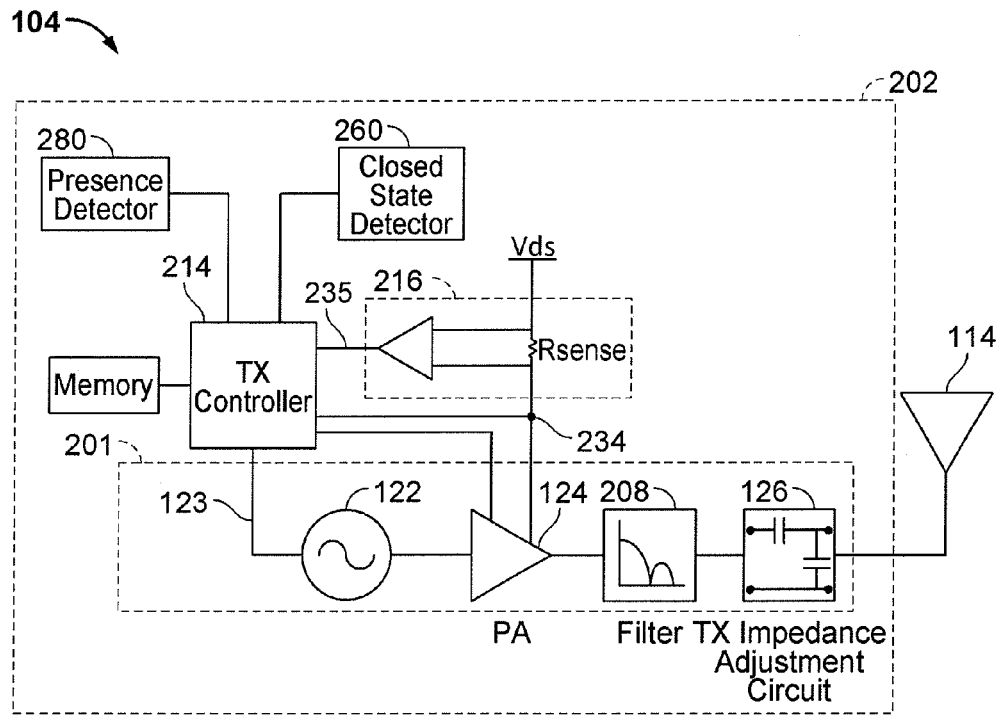
FIG. 5 is a block diagram of a wireless power transmitter according to some embodiments.

FIG. 5 is a block diagram of a wireless power transmitter 104 according to some embodiments. Wireless power transmitter 104 may be included in a charger, such as a charger 182 as described with reference to FIG. 4 above. The wireless power transmitter 104 includes transmitter circuitry 202 and a wireless power transmit coil 114. Transmitter circuitry 202 provides RF power to the wireless power transmit coil 114 by providing an oscillating signal to drive the wireless power transmit coil 114. Based on the oscillating signal, the wireless power transmit coil 114 generates an electromagnetic field for transmitting energy from the wireless power transmitter 104. The wireless power transmitter 104 may operate at any suitable frequency. By way of example, wireless power transmitter 104 may operate at the 13.56 MHz ISM band.

Transmitter circuitry 202 includes a TX impedance adjustment circuit 126 configured to adjust the impedance of the transmitter circuitry 202 based on an impedance of the wireless power transmit coil 114 and a low pass filter (LPF) 208 in order to maximize power transmitted by the wireless power transmitter 104. The LPF 208 may be configured to reduce harmonic emissions to levels to prevent self-jamming of devices coupled to wireless power receivers 108. Other embodiments may include different filter topologies, including but not limited to, notch filters that attenuate specific frequencies while passing others and may include an adaptive impedance match, that can be varied based on measurable transmit metrics, such as output power to the coil or DC current drawn by a driver. Transmitter circuitry 202 further includes a driver 124 configured to drive an RF signal as determined by an wireless power signal generator 122. The transmit circuitry 202 may include discrete devices or circuits, and/or may include an integrated circuit. An RF power output from wireless power transmit coil 114 may be within a range of about 2-5 Watts, but is not limited thereto.

Transmitter circuitry 202 further includes a Tx controller 214 for enabling the wireless power signal generator 122 during transmit phases (or duty cycles) for specific receivers, for adjusting the frequency or phase of the oscillator, and for adjusting the output power level for implementing a communication protocol for interacting with neighboring devices through their attached receivers. Adjustment of oscillator phase and related circuitry in the transmission path allows for reduction of out of band emissions, especially when transitioning from one frequency to another.

The transmitter circuitry 202 may further include a load sensing circuit 216 for detecting the presence or absence of active receivers, vulnerable devices, and other objects in the vicinity of the wireless power transfer region 190 generated by wireless power transmit coil 114. By way of example, a load sensing circuit 216 monitors the current flowing to the driver 124 and voltage level of the driver 124 (e.g., as illustrated by current signal 235, and voltage signal 234), which is affected by the presence or absence of active receivers and/or vulnerable devices and/or other object that may change the load seen by the wireless power transmitter in the vicinity of the charging region generated by wireless power transmit coil 114. Detection of changes to the loading on the driver 124 are monitored by Tx controller 214 for use in determining whether to enable the wireless power signal generator 122 for transmitting energy and communicating with an active receiver. As described in greater detail with reference to FIG.

12 below, a current and/or a voltage measured at driver 124 may be used to determine whether a "vulnerable" device (e.g., a device that may be damaged by a wireless power transfer field), such as a communication device 188, is positioned within a wireless power transfer region 190 of the wireless power transmitter 104.

Wireless power transmit coil 114 may be implemented with a Litz wire or as a coil strip with the thickness, width, and metal type selected to keep resistive losses low. The wireless power transmit coil 114 can generally be configured for association with a larger structure such as a table, mat, lamp or other less portable configuration. Accordingly, the wireless power transmit coil 114 generally will not need "turns" in order to be of a practical dimension. An implementation of a wireless power transmit coil 114 may be "electrically small" (e.g., on the order of a fraction of the wavelength) and tuned to resonate at lower usable frequencies by using capacitors to define the resonant frequency.

The wireless power transmitter 104 may gather and track information about the whereabouts and status of receiver devices that may be associated with the wireless power transmitter 104. Thus, the transmitter circuitry 202 may include a presence detector 280, an closed state detector 260, or a combination thereof, connected to the Tx controller 214. The Tx controller 214 may adjust an amount of power delivered by the driver 124 in response to presence signals from the presence detector 280 and the closed state detector 260. The wireless power transmitter 104 may receive power through a number of power sources, such as, for example, an AC-DC converter (not shown) to convert conventional AC power present in a building, a DC-DC converter (not shown) to convert a conventional DC power source to a voltage suitable for the wireless power transmitter 104, or directly from a conventional DC power source (not shown).

The presence detector 280 may include a motion detector utilized to sense the initial presence of a device to be charged that is inserted into the coverage area of the wireless power transmitter 104. After detection, the wireless power transmitter 104 may be turned on and the RF power received by the device may be used to toggle a switch on the Rx device in a pre-determined manner, which in turn results in changes to the driving point impedance of the wireless power transmitter 104.

The presence detector 280 may also include a detector capable of detecting a human, for example, by infrared detection, motion detection, or other suitable means. In some embodiments, there may be regulations limiting the amount of power that a transmit coil may transmit at a specific frequency. In some cases, these regulations are meant to protect humans, or other biological beings, from electromagnetic radiation. However, there may be environments where transmit coils are placed in areas not occupied by humans, or occupied infrequently by humans, such as, for example, garages, factory floors, shops, and the like. If these environments are free from humans, it may be permissible to increase the power output of the transmit coils above the normal power restrictions regulations. In other words, the Tx controller 214 may adjust the power output of the wireless power transmit coil 114 to a regulatory level or lower in response to human presence and adjust the power output of the wireless power transmit coil 114 to a level above the regulatory level when a human is outside a regulatory distance from the electromagnetic field of the wireless power transmit coil 114.

As a non-limiting example, the closed state detector 260 (may also be referred to herein as an enclosed compartment detector or an enclosed space detector) may be a device such as a sense switch for determining when an enclosure is in a closed or open state. When a wireless power transmitter 104 is included within an enclosure that is in an enclosed state, a power level of the wireless power transmitter 104 may be increased.

In some embodiments, a method by which the wireless power transmitter 104 does not remain on indefinitely may be used. In this case, the wireless power transmitter 104 may be programmed to shut off after a user-determined amount of time. This feature prevents the wireless power transmitter 104, notably the driver 124, from running long after the wireless devices in its perimeter are fully charged. This event may be due to the failure of the circuit to detect the signal sent from either the repeater or the receive coil that a device is fully charged. To prevent the wireless power transmitter 104 from automatically shutting down if another device is placed in its perimeter, the wireless power transmitter 104 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 6:
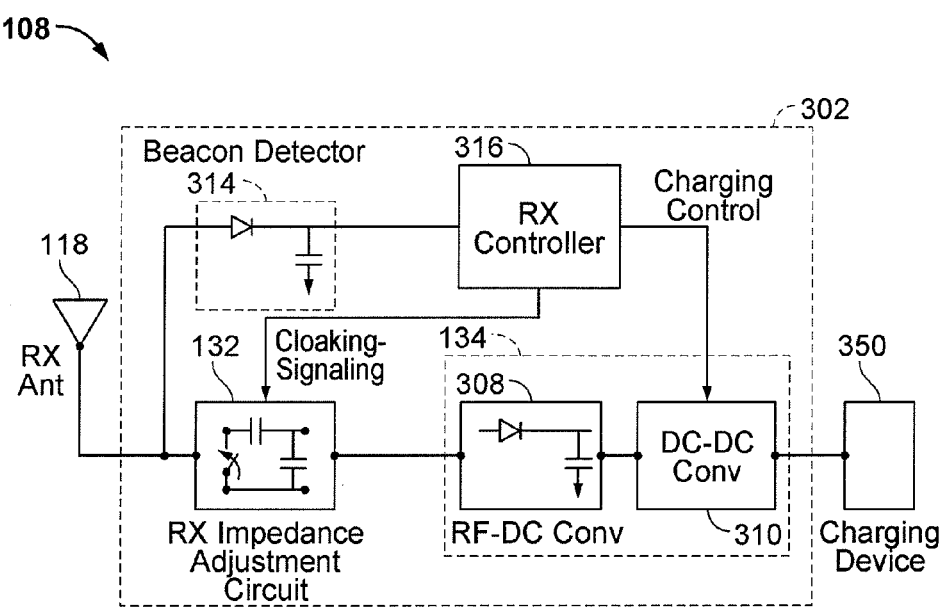
FIG. 6 is a block diagram of a wireless power receiver according to some embodiments.

FIG. 6 is a block diagram of a wireless power receiver 108 according to some embodiments. A wireless power receiver 108 may be included in a chargeable devices 184 as described with reference to FIG. 4 above, and may be configured to receive power from a charger, such as a charger 182 including a wireless power transmitter (e.g. wireless power transmitter 104) as described above. The wireless power receiver 108 includes receive circuitry 302 and a wireless power receive coil 118. Wireless power receiver 108 may be coupled to a charging device 350 for transferring received power thereto. The wireless power receiver 108 is illustrated as being external to device 350 but may be integrated into device 350. Energy may be propagated wirelessly to wireless power receive coil 118 and then coupled through receive circuitry 302 to charging device 350.

Wireless power receive coil 118 is tuned to resonate at the same frequency, or within a specified range of frequencies, as wireless power transmit coil 114. Wireless power receive coil 118 may be similarly dimensioned with wireless power transmit coil 114 or may be differently sized based upon the dimensions of the associated charging device 350. By way of example, charging device 350 may be a portable electronic device having a diametric or length dimension smaller that the diameter or length of wireless power transmit coil 114. In such an example, wireless power receive coil 118 may be implemented as a multi-turn coil in order to reduce the capacitance value of a tuning capacitor (not shown) and increase the impedance of the wireless power receive coil 118. Wireless power receive coil 118 may be placed around the substantial circumference of charging device 350 in order to maximize the coil diameter and reduce the number of loop turns (e.g., windings) of the wireless power receive coil 118 and the inter-winding capacitance.

The receive circuitry 302 may include Rx impedance adjustment circuit 132 for adjusting an impedance of the components of the receiver circuitry 302 to the wireless power receive coil 118. Receive circuitry 302 may include a power conversion circuit 134 for converting a received RF energy source into charging power for use by device 350. The power conversion circuit 134 may generally be referred to as a voltage regulator for converting the received power from the wireless filed to power for charging the load. In some implementations, the power conversion circuit 134 includes an RF-to-DC converter 308 and may also in include a DC-to-DC converter 310. The RF-to-DC converter 308 rectifies the RF energy signal received from the wireless power receive coil 118 to a power signal having a direct current {what is non-alternating power?}, while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

The receive circuitry 302 may further include switching circuitry (not shown) for connecting wireless power receive coil 118 to the power conversion circuit 134 or alternatively for disconnecting the power conversion circuit 134. Disconnecting wireless power receive coil 118 from power conversion circuit 134 not only suspends charging of device 350, but also changes the "load" as "seen" by the wireless power transmitter 104.

As disclosed above, wireless power transmitter 104 includes load sensing circuit 216 which detects fluctuations in the bias current provided to transmitter driver 124, and/or fluctuations in a voltage level of the driver 124. Accordingly, wireless power transmitter 104 has a mechanism for determining when wireless power receivers 108 and/or vulnerable devices are present within the wireless power transfer region 190 of the wireless power transmitter 104.

When multiple wireless power receivers 108 are present in the wireless power transfer region 190, it may be desirable to time-multiplex the loading and unloading of one or more receivers to enable other receivers to more efficiently couple to the wireless power transmitter 104. A wireless power receiver 108 may also be cloaked in order to eliminate coupling to other nearby receivers or to reduce loading on nearby transmitters. This "unloading" of a wireless power receiver 108 may also be referred to as "cloaking." The switching between unloading and loading controlled by wireless power receiver 108 and detected by wireless power transmitter 104 may provide a communication mechanism from the wireless power receiver 108 to wireless power transmitter 104. Additionally, a protocol can be associated with the switching which enables sending a message from the wireless power receiver 108 to the wireless power transmitter 104. By way of example, a switching speed may be on the order of 100 μsec.

According to some embodiments, communication between the wireless power transmitter 104 and the wireless power receiver 108 refers to a device sensing and charging control mechanism, rather than conventional two-way communication (e.g., in band signaling using the coupling field). In other words, the wireless power transmitter 104 may use on/off keying of the transmitted signal to adjust whether energy is available in the near-field. The wireless power receiver 108 may interpret these changes in energy as a message from the wireless power transmitter 104. From the receiver side, the wireless power receiver 108 may use tuning and de-tuning of the receive coil 118 to adjust how much power is being accepted from the field. In some cases, the tuning and de-tuning may be accomplished via the Rx impedance adjustment circuit 132 and the Tx impedance adjustment circuit 126. The wireless power transmitter 104 may detect this difference in power used from the field and interpret these changes as a message from the wireless power receiver 108. It is noted that other forms of modulation of the transmit power and the load behavior may be utilized.

The receive circuitry 302 may further include beacon detector 314 used to identify received energy fluctuations, which may correspond to informational signaling from the wireless power transmitter 104 to the wireless power receiver 108. Furthermore, beacon detector 314 may also be used to detect the transmission of a reduced RF energy signal (e.g., a beacon signal) and to rectify the reduced RF energy signal into a signal having nominal power for awakening either un-powered or power-depleted circuits within receive circuitry 302 in order to control receive circuitry 302 for wireless charging.

The receive circuitry 302 further includes Rx controller 316 for coordinating the processes of wireless power receiver 108 described herein. Cloaking of wireless power receiver 108 may also occur upon the occurrence of other events including detection of an external wired charging source (e.g., wall/USB power) providing charging power to charging device 350. Rx controller 316, in addition to controlling the cloaking of the wireless power receiver 108, may also monitor beacon detector 314 to determine a beacon state and extract messages sent from the wireless power transmitter 104. Rx controller 316 may also adjust DC-to-DC converter 310 to increase the efficiency of the charging system.

Figure 7:
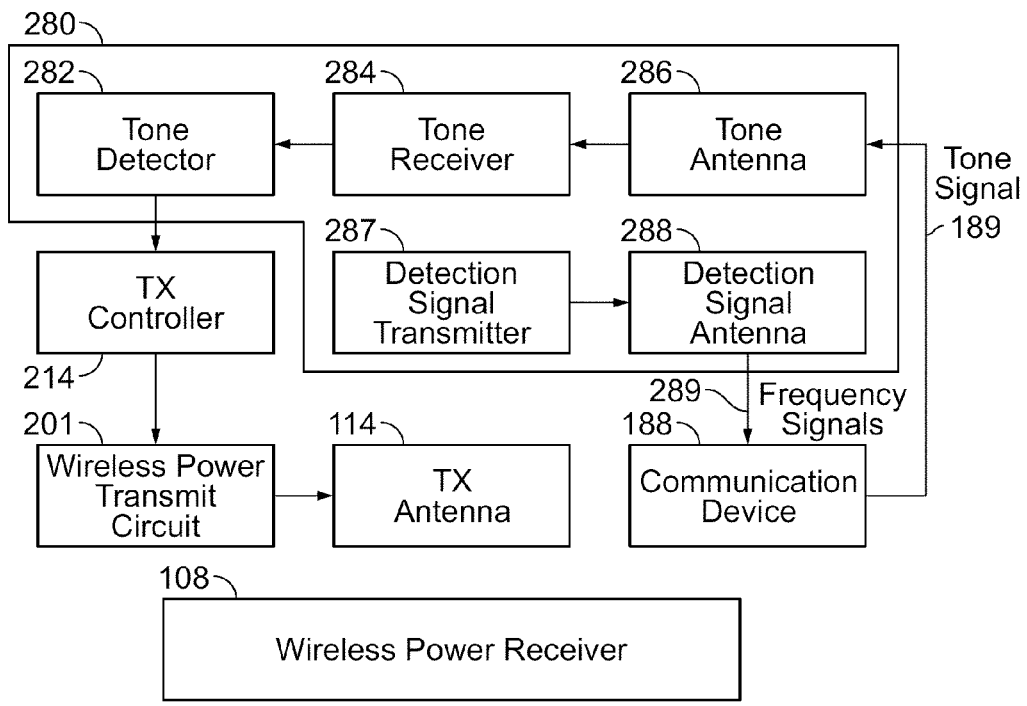
FIG. 7 illustrates a block diagram of a presence detector according to some embodiments.

According to some embodiments, a presence detector 280 may be configured to detect the presence of a communication device 188 (e.g., a near field communication card) by transmitting continuous wave tones and detecting intermodulation products. FIG. 7 illustrates a block diagram of a presence detector 280 according to some embodiments. The presence detector 280 may be included as part of the transmitter circuitry 202 as described above with reference to FIG. 5. The presence detector 280 may include a detection signal transmitter 287 configured to drive a detection signal antenna 288 to generate frequency signals 289. Frequency signals 289 may correspond to, for example, continuous wave tones for detection of a communication device 188. The operation of the detection signal transmitter 287 will be described in greater detail below with reference to FIG. 8.

The frequency signals 289 may interact with or be received by communication device 188. The communication device 188 may generate a tone signal 189 based on the interaction of the communication device 188 with the frequency signals 289. For example, a tone signal 189 may include harmonics of the frequency signals 289. The tone signal 189 may be received by a tone antenna 286 of the presence detector 280. The tone antenna 286 may be connected to the tone receiver 284 and be configured to receive and analyze the tone signal 189 received by the tone antenna 286. The tone receiver 284 may be connected to a tone detector 282, and may provide an output of the analyzed tone signal 189 to the tone detector 282.

A wireless power receiver 108 may be within a wireless power transfer region 190 of the wireless power transmit coil 114, and may be configured to receive power from the field generated by the wireless power transmit coil 114 as discussed above. The tone detector 282 may be configured to provide an output to the Tx controller 214 for detection of the presence of a communication device 188. As discussed above, the Tx controller 214 may be connected to the wireless power transmit circuit 201, and may be configured to control the operation of the wireless power transmit circuit 201. For example, the Tx controller 214 may be configured to reduce or turn off a wireless power field generated by the wireless power transmit circuit 201 through the wireless power transmit coil 114.

Figure 8:
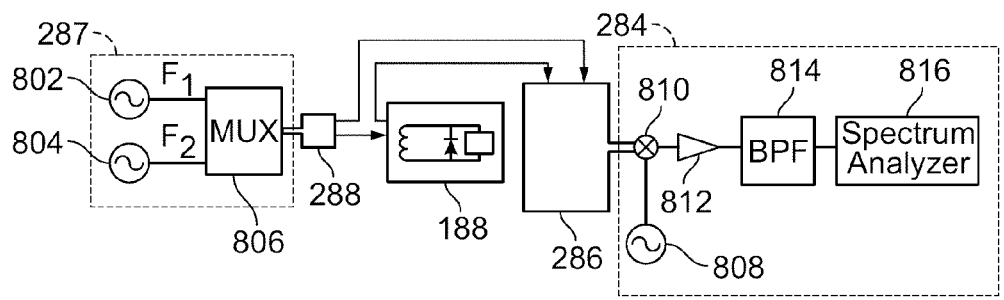
FIG. 8 illustrates a more detailed block diagram of the components illustrated in FIG. 7 according to some embodiments.

FIG. 8 illustrates a more detailed block diagram of the components illustrated in FIG. 7 according to some embodiments. As illustrated in FIG. 8, a detection signal transmitter 287 may include a first frequency signal generator 802 and a second frequency signal generator 804 configured to generate a first signal at a first frequency $F_1$ and a second signal at a second frequency $F_2$. The first and second signals may be received by a combining circuit 806 included in the detection signal transmitter 287. The combining circuit 806 linearly adds the first signal at the first frequency $F_1$ and the second signal at the second frequency $F_2$ for driving the detection signal antenna 288. The detection signal antenna 288 is configured to transmit a continuous wave corresponding to the first frequency $F_1$ and the second frequency $F_2$. The communication device 188 may interact with the signals transmitted by the detection signal antenna 288. The tone antenna 286 may be configured to receive a third signal (e.g., a signal corresponding to the intermodulation product of the first signal and the second signal). The tone antenna 286 may be connected to a multiplier 810 included in the tone receiver 284. The multiplier 810 may also be connected to a tone detection signal generator 808. The tone detection signal generator 808 may be configured to generate a signal at a frequency for analyzing the signal received by the tone antenna 286. A detection signal amplifier 812 may be connected to the output of the multiplier 810, and may be configured to amplify the output of the multiplier 810 corresponding to the combination of the signal received by the tone antenna 286 and the tone detection signal generator 808. A filter, for example a bandpass filter 814, may be connected to the output of the detection signal amplifier 812 and may be configured to filter out undesired harmonics from the signal received from the detection signal amplifier 812. A spectrum analyzer 816 may be connected to the output of the bandpass filter 814, and may be configured to analyze the filtered signal and detect the presence of particular harmonics in the signal to be provided an output to the tone detector 282 as discussed above the reference to FIG. 7.

FIGS. 9A-9C illustrate some examples of a first frequency signal and a second frequency signal and a detected third frequency signal according to some embodiments. As illustrated in FIG. 9A, presence detector 280 may detect the communication device 188 by transmitting a signal at a first frequency ($F_1$) and a second frequency ($F_2$) within the bandwidth of communication device 188. For example, if the communication device 188 is an RFID tag, the bandwidth may be between about 12 and 18 MHz. The first frequency $F_1$ and the second frequency $F_2$ may correspond to modulated or un-modulated frequencies. The signal at the first frequency and the signal at the second frequency interact with the electronics of the communication device 188 and cause the communication device 188 to generate the signal as the first frequency and the signal at the second frequency. Due to nonlinearities, additional frequencies are generated as harmonics and mixing products. For example, the communication device 188 may generate harmonics at twice the first frequency ($2F_1$) and twice the second frequency ($2F_2$). The communication device 188 may generate second order intermodulation products at the sum and difference of the first and second frequency (e.g., $F_1+F_2$, and/or $F_1-F_2$). As illustrated in FIG. 9B, the communication device 188 may also generate third order intermodulation products (e.g., $IM_{3\_lower}$, $IM_{3\_upper}$, as illustrated in FIG. 9B). For example, the communication device may generate third order intermodulation products within the bandwidth of the communication device according to $2F_1-F_2$ and/or $2F_2-F_1$. By detecting the intermodulation product, the wireless power transmitter may determine that a communication device 188 is present, and may reduce the strength of the wireless power field or cease transmission of wireless power. For example, as illustrated in FIG. 9C, if an intermodulation product (e.g., $IM_{3\_lower}$ as illustrated in FIG. 9C) exceeds a threshold value, the presence detector 280 may determine that a communication device 188 is present within the wireless power transfer region 190 of a wireless power transmitter 104. Through detection of the intermodulation products, the presence detector 280 may be configured to detect a communication device 188 based on the characteristic nonlinearities of the communication device 188. As a result, the detection of the communication device 188 is not dependent on specific standards corresponding to the communication device 188.

FIG. 10 illustrates a more detailed block diagram of the presence detector 280 according to some embodiments. The presence detector 280 may include a crystal 1000 (e.g., oscillating at a frequency of 13.56 MHz). The crystal 1000 and may also be provided separately from the presence detector 280, or may be part of the transmitter circuitry 202. A frequency divider 1002 may be connected to the output of the crystal 1000, and may be configured to divide the signal generated by the crystal 1000 by a frequency division value. For example, the divider 1002 may be configured to receive a signal having a frequency of 13.56 MHz, and generate an output signal at a frequency of 6.99 kHz by dividing the received signal by a division value of 1940. The presence detector 280 may also include first, second, and third frequency multipliers 1004, 1006, and 1008 each having a corresponding frequency multiplication value (e.g., as illustrated, M1, M2, and M3, respectively). For example, the first frequency multiplier 1004 may receive a frequency signal at 6.99 kHz and generate an output signal at 13.553 MHz (M1=1939). The second frequency multiplier 1006 may receive a frequency signal at 6.99 kHz and generate an output signal that 13.567 MHz (M2=1941). The third frequency multiplier 1008 may receive a frequency signal at 6.99 kHz and generate an output signal at 3.537 MHz (M3=506). The output of each of the first, second, and third frequency multipliers 1004, 1006, and 1008 may be amplified by first, second, and third frequency signal amplifiers 1110A-C. The output of the first and second frequency signal amplifiers 1110A and 1110B may be received by the combining circuit 806, and may be used to transmit the frequency detection signals through the detection signal antenna 288 as discussed above with reference to FIGS. 7 and 8.

The output of the third frequency signal amplifier 1110C may be received by the multiplier 810, and may be used to detect and analyze the signal received by the tone antenna 286. As discussed above with reference to FIG. 8, the output of the multiplier 810 may be filtered by bandpass filter 814. The filtered signal may be amplified by a tone detection signal amplifier 1112, and maybe analyzed by spectrum analyzer 816 for detection of the presence of communication device 188.

Figure 11:
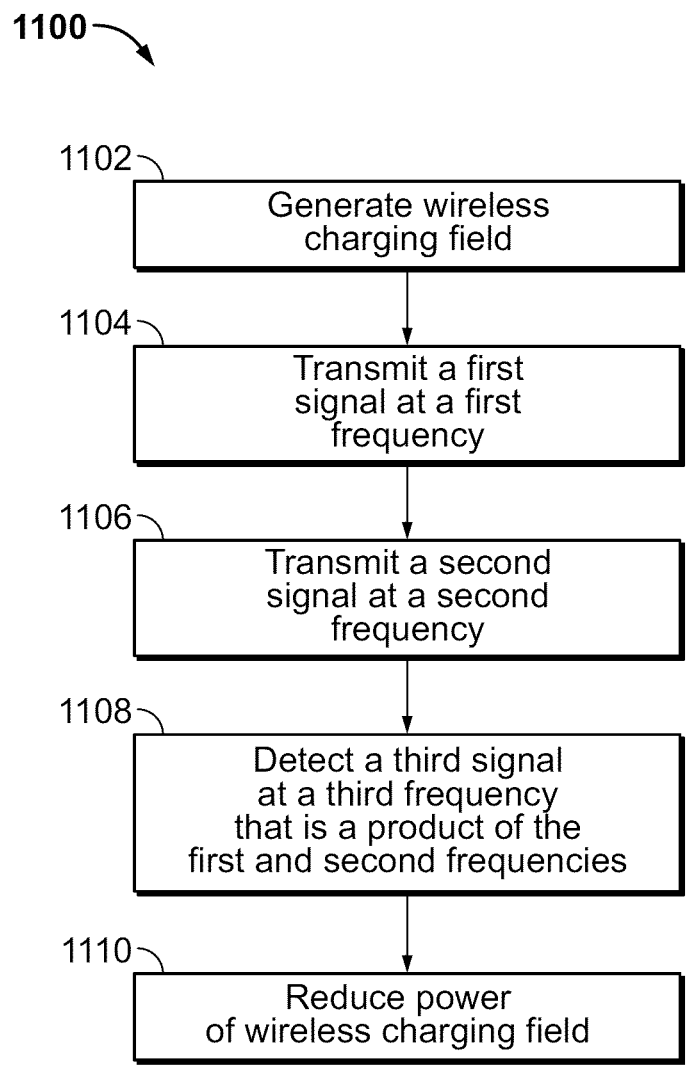
FIG. 11 illustrates a flowchart of a method of detection and protection of a communication device according to some embodiments.

FIG. 11 illustrates a flowchart of a method of detection and protection of a communication device 188 according to some embodiments. The method 1100 may be implemented in a transmitter device, for example a wireless power transmitter 104. The method 1100 may begin by generating a wireless power transfer field as illustrated by block 1102. For example, the wireless power transfer field may be generated by a charger 182 including a wireless power transmitter 104 as discussed above. The method may continue by transmitting a first signal at a first frequency as illustrated by block 1104, and transmitting a second signal at a second frequency as illustrated by block 1106. For example, a presence detector 280 may include a detection signal transmitter 287 and a detection signal antenna 288 for transmitting the signal at the first frequency and the signal the second frequency (e.g., frequency signals 289 as discussed above with reference to FIG. 7). The method may continue by detecting a third signal at a third frequency that is a product of the first and second frequencies as illustrated by block 1108. For example the third signal may correspond to a second or third order intermodulation product of the first frequency and the second frequency. The method may determine that a communication device 188 is present based on the detection of the third signal, and may reduce the power level of the wireless power transfer field as illustrated by block 1110.

Figure 12:
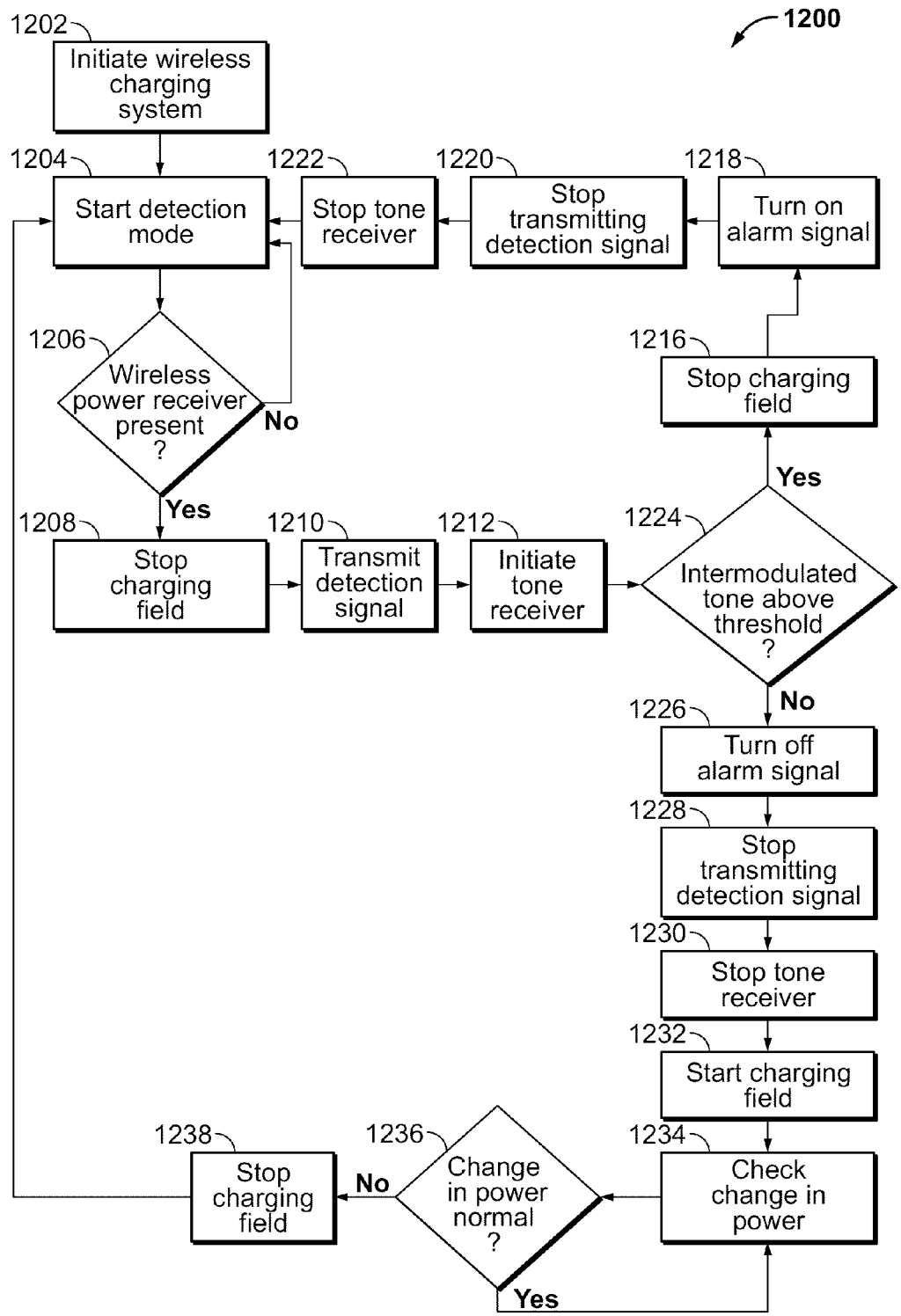
FIG. 12 illustrates a flowchart of a method of detection and protection of communication device according to some embodiments.

FIG. 12 illustrates a flowchart of a method of detection and protection of communication device 188 according to some embodiments. The method 1200 may be implemented in a transmitter device, for example a wireless power transmitter 104. The method 1200 may begin by initiating a wireless power transfer field as illustrated by block 1202. At block 1204, a detection mode may be initiated for detection of a communication device 188 or wireless power receiver 108. At decision block 1206, it may be determined whether a wireless power receiver is present. For example, the current and voltage levels of a wireless power transmitter 104 may be monitored to determine the presence of the wireless power receiver 108 as discussed above with reference to FIG. 5. If it is determined that a wireless power receiver is not present, the method may return to block 1204 for continually monitoring for the presence of a wireless power receiver 108. If a wireless power receiver 108 is present, the method proceeds by stopping a wireless power transfer field as illustrated by block 1208. For example, a wireless power transfer field may initially be generated by a wireless power transmitter 104 for charging wireless power receiver 108. The wireless power transfer field may be stopped by operation of the Tx controller 214. The method may continue by transmitting a detection signal as illustrated by block 1210. For example, the detection signal may include a signal at a first frequency $F_1$ and a signal at a second frequency $F_2$. At block 1212 a tone receiver may be initiated. For example tone receiver 284 may be initiated for detection of a tone signal 189 through the tone antenna 286 as discussed above with reference to FIG. 7. At decision block 1224, it may be determined whether an intermodulated tone is above a threshold level. For example, the intermodulation tone may correspond to a second or third order intermodulation harmonic generated by a communication device 188. If it is determined that the inter modulated tone is above a threshold level, the method may proceed by stopping the wireless power transfer field as illustrated by block 1216. At block 1218, an alarm signal may be generated. The method may proceed by stopping transmission of the detection signal at block 1220, and stopping the tone receiver at block 1222, and return to block 1204 for continually monitoring the presence of wireless power receivers 108 and communication devices 188.

It is determined at decision block 1224 that the intermodulation tone is not above the threshold, the method may determine that a communication device 188 is not present within a wireless power transfer region 190 of a wireless power transmitter 104, and may proceed to block 1226 for disabling the alarm signal. A block 1228 the method may discontinue transmission of the detection signal. At block 1230, the method may continue by stopping a tone receiver, and at block 1232 the wireless power transfer field may be generated. At block 1234, the method may monitor and detect a change in power of the wireless power transmitter 104. For example the method may monitor and detect current and voltage change of a driver 124 included in the wireless power transmitter to 202. At decision block 1236, the method may determine whether the change in power corresponds to an expected amount. For example the method may compare the change in power with a threshold, and may determine whether the change in power corresponds to the operation of the wireless power transmitter 104 during charging of the wireless power receiver 108.

According to some embodiments, the change in wireless power delivery caused by the presence of a communication device 188, such as an NFC card, may be within a range of about 100 mW to about 200 mW. An expected change in power delivery during power transfer from a wireless power transmitter 104 to wireless power receivers 108 (e.g., normal power transfer) can range from about 100 mW to about 1 W. Therefore, the change in power may be compared to a threshold value corresponding to a change within the normal power transfer range (e.g., greater than 200 mW), with some variance based on the resolution of the detection system. For example, for a power delivery detection system having a resolution of 100 mW, the change in power may be compared to a threshold that has a value of 300 mW. If the change in power is greater than 300 mW, the system may determine that the change in power is within an expected range of variation during power transfer to wireless power receivers 108. As discussed above with reference to FIG. 5, the change in power may be determined by monitoring the change in current and sensing a voltage of a driver 124 (e.g., change in power=change in driver current*driver voltage).

If it is determined that the change in power corresponds to an expected change in power, the method may return to block 1234 for continuously monitoring the change in power of the wireless power transmitter 104. If it is determined that the change in power is not what was expected, the method may proceed to block 1238 and a wireless power transfer field may be stopped. The method may then return to block 1204 for continuously monitoring for the presence of wireless power receivers 108 and communication devices 188.

While not illustrated, the method may also include intermittently stopping the wireless power transfer field at intervals for detection of the presence of a communication device 188. Since the power level of the wireless power transfer field may be much greater than the power level of the detection signals, it may be difficult to detect the presence of the communication device 188 during the presence of the power transfer field. In some embodiments, a wireless power transfer field may have a power output of about 3 W. A tone signal 189 (e.g., an intermodulation signal) may have a power within a range of about 1 pW.

As a result, the ratio of a 3 W wireless power transfer field to a detected 1 pW tone signal 189 is about 95 dB. In some embodiments, the wireless power transfer field can be interrupted during a detection interval for detection of a tone signal 189. For example, the wireless power transfer field may be interrupted for about 50 uS without interrupting wireless power transfer to a wireless power receiver 302 and a charging device 350. The frequency of the interrupt and detection interval may be set to reduce or eliminate potential damage to a communication device 188 such as an NFC card. For example, for an NFC card that can be damaged by wireless power transfer field energy that exceeds 1 Watt-Second, the interruption of a 3 W wireless power transfer field may occur at an interval of about 0.33 seconds, with some additional safety variance.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

Figure 13:
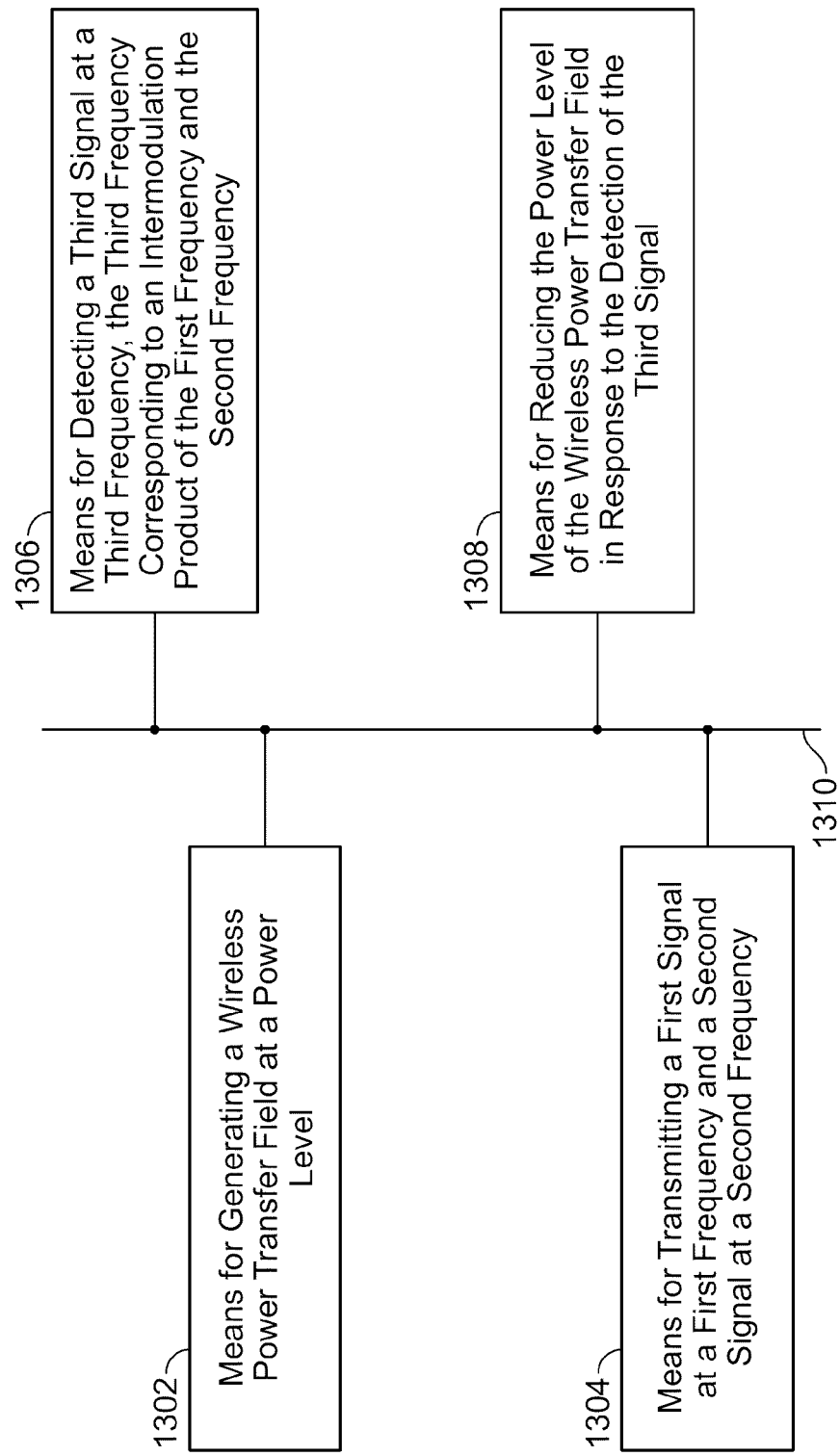
FIG. 13 illustrates a block diagram of a system according to some implementations.

The functionality described herein (e.g., with regard to one or more of the accompanying figures) may correspond in some aspects to similarly designated "means for" functionality in the appended claims. For example, FIG. 13 illustrates a block diagram of a system according to some implementations. With reference to FIG. 13, means for generating a wireless power transfer field at a power level 1302 may correspond to a wireless power transmitter 104 including a wireless power transmit coil 114, means for transmitting a first signal at a first frequency and a second signal at a second frequency 1304 may correspond to a detection signal transmitter 287 including a detection signal antenna 288, means for detecting a third signal at a third frequency 1306, such that the third frequency corresponds to an intermodulation product of the first frequency and the second frequency may correspond to a tone receiver 284 including a tone antenna 286, and means for reducing the power level of the wireless power transfer field in response to the detection of the third signal 1308 may correspond to a Tx controller 214. As illustrated in FIG. 13, the various components may be configured to communicate with each other via a communication bus 1310.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A method of detecting a communication device within a wireless power transfer region of a wireless power transmitter configured to transfer power to a device, the method comprising:
generating a wireless power transfer field at a power level;
transmitting a first signal at a first frequency and a second signal at a second frequency; and
detecting a third signal at a third frequency, the third frequency corresponding to an intermodulation product of the first frequency and the second frequency; and
reducing the power level of the wireless power transfer field in response to the detection of the third signal.

2. The method of claim 1, further comprising:
monitoring a change in a power drawn by the wireless power transmitter; and
identifying the communication device based on at least one of the monitored change in the power drawn and the detection of the third signal.

3. The method of claim 2, wherein monitoring the change in power comprises monitoring a change in current drawn by a driver of the wireless power transmitter.

4. The method of claim 2, wherein monitoring the change in power comprises monitoring a change in voltage of a driver of the wireless power transmitter.

5. The method of claim 1, wherein the first signal and the second signal are not modulated.

6. The method of claim 1, wherein the third frequency corresponds to a frequency having a value that is twice a value of the first frequency less a value of the second frequency.

7. The method of claim 1, further comprising stopping the generation of the wireless power transfer field for an interval; and monitoring for a presence of the third signal during the interval.

8. The method of claim 1, wherein the intermodulation product is one of a second order intermodulation product and a third order intermodulation product.

9. An apparatus comprising:
a wireless power transmitter configured to generate a wireless power transfer field at a power level;
a detection signal transmitter configured to transmit a first signal at a first frequency and a second signal at a second frequency;
a tone receiver configured to detect a third signal at a third frequency, the third frequency corresponding to an intermodulation product of the first frequency and the second frequency; and a controller configured to reduce the power level of the wireless power transfer field in response to the detection of the third signal.

10. The apparatus of claim 9, further comprising:
a sensor configured to sense an amount of power drawn by the wireless power transmitter to generate a sensing signal; and
a controller configured to monitor a change in a power drawn by the wireless power transmitter based on the sensing signal and identify a communication device based on at least one of the monitored change in the power drawn and the detection of the third signal.

11. The apparatus of claim 10, wherein the wireless power transmitter includes a driver, and wherein the sensor is configured to sense an amount of current drawn by the driver.

12. The apparatus of claim 10, wherein the wireless power transmitter includes a driver, and wherein the sensor is configured to sense a voltage level of the driver.

13. The apparatus of claim 9, wherein the first signal and the second signal are not modulated.

14. The apparatus of claim 9, wherein the third frequency corresponds to a frequency having a value that is twice a value of the first frequency less a value of the second frequency.

15. The apparatus of claim 9, wherein the intermodulation product is one of a second order intermodulation product and a third order intermodulation product.

16. An apparatus for detecting a communication device within a wireless power transfer region, the apparatus comprising:
means for generating a wireless power transfer field at a power level;
means for transmitting a first signal at a first frequency and a second signal at a second frequency;
means for detecting a third signal at a third frequency, the third frequency corresponding to an intermodulation product of the first frequency and the second frequency; and
means for reducing the power level of the wireless power transfer field in response to the detection of the third signal.

17. The apparatus of claim 16, wherein the means for generating a wireless power transfer field comprises a wireless power transmitter including a wireless power transmit coil, the means for transmitting a first signal and the second signal comprises a detection signal transmitter including a detection signal antenna, the means for detecting the third signal comprises a tone receiver including a tone antenna, and the means for reducing the power level comprises a controller.

18. The apparatus of claim 17, further comprising:
means for monitoring a change in a power drawn by the wireless power transmitter; and
means for identifying the communication device based on at least one of the monitored change in the power drawn and the detection of the third signal.

19. A computer program product for processing data for a program configured to detect a communication device within a wireless power transfer region of a wireless power transmitter configured to transfer power to a device via a wireless power transfer field, the computer program product comprising:
a non-transitory computer-readable medium having stored thereon code for causing processing circuitry to:
transmit a first signal at a first frequency and a second signal at a second frequency;
detect a third signal at a third frequency, the third frequency corresponding to an intermodulation product of the first frequency and the second frequency; and
reduce a power level of the wireless power transfer field in response to the detection of the third signal.

20. The computer program product of claim 19 further comprising code for causing processing circuitry to:
monitor a change in a power drawn by the wireless power transmitter;
identify the communication device based on at least one of the monitored change in the power drawn and the detection of the third signal.

* * * * *